United States Patent
Kawamoto et al.

(10) Patent No.: US 7,385,320 B2
(45) Date of Patent: Jun. 10, 2008

(54) STEP MOTOR

(75) Inventors: Hisashi Kawamoto, Chiba (JP); Seiichi Oishi, Chiba (JP)

(73) Assignee: Seiko Precision, Inc., Chiba (JP)

( * ) Notice: Subject to any disclaimer, the term of this patent is extended or adjusted under 35 U.S.C. 154(b) by 0 days.

(21) Appl. No.: 11/386,419

(22) Filed: Mar. 22, 2006

(65) Prior Publication Data
US 2006/0226716 A1    Oct. 12, 2006

Related U.S. Application Data

(63) Continuation of application No. 10/562,329, filed as application No. PCT/JP2004/009100 on Jun. 28, 2004, now abandoned.

(30) Foreign Application Priority Data
Jun. 30, 2003  (JP) ............... 2003-188980

(51) Int. Cl.
*H02K 37/14* (2006.01)
(52) U.S. Cl. .............. 310/49 R; 310/40 MM
(58) Field of Classification Search .......... 310/49 R, 310/216, 40 MM; 368/126, 156, 163, 204, 368/208; 968/490, 492, 550
See application file for complete search history.

(56) References Cited

U.S. PATENT DOCUMENTS

| 4,088,909 A * | 5/1978 | Matsumura et al. ...... 310/49 R |
| 4,144,467 A * | 3/1979 | Nakajima et al. ......... 310/49 R |
| 4,186,322 A * | 1/1980 | Besson ....................... 310/194 |
| 4,205,244 A * | 5/1980 | Fukushima ............... 310/49 R |
| 4,361,790 A   | 11/1982 | Laesser et al. |
| 4,371,821 A * | 2/1983 | Laesser et al. ............. 318/696 |
| 4,565,955 A   | 1/1986 | Kubota |
| 4,600,864 A * | 7/1986 | Sato .......................... 318/254 |
| 6,012,217 A * | 1/2000 | Kliman et al. ................ 29/596 |
| 7,211,910 B2* | 5/2007 | Kawamoto et al. ....... 310/49 R |

FOREIGN PATENT DOCUMENTS

| CH | 625646 | 7/1979 | |
| JP | 354134313 | * 10/1979 | ............... 310/49 R |
| JP | 59-80147 | 5/1984 | |
| JP | 61085055 | 4/1986 | |

OTHER PUBLICATIONS

International Search Report dated Sep. 28, 2004.
U.S. Appl. No. 11/388,871, filed Mar. 24, 2006, Kawamoto et al.

* cited by examiner

*Primary Examiner*—Tran Nguyen
(74) *Attorney, Agent, or Firm*—Michaud-Duffy Group, LLP

(57) ABSTRACT

A step motor includes a rotor having four magnetic poles, a first magnetic pole magnetically excited by a first coil, a second magnetic pole magnetically excited by a second coil, and a third magnetic pole magnetically excited by the first coil and the second coil. A gap between the third magnetic pole and the rotor is smaller than that between the first magnetic pole and the rotor and that between the second magnetic pole and the rotor. In the step motor, it is possible to intensify the influence, on the rotor having four poles, of the magnetic fields created from three magnetic poles. Accordingly, this can weaken the magnetic fields set up from the first magnetic pole and the second magnetic pole, which tend to intensify the influence on the rotor, enabling the torque smaller at the time of the rotation start of the rotor.

3 Claims, 7 Drawing Sheets

STEP MOTOR

CROSS-REFERENCE TO RELATED APPLICATIONS

This application is a continuation of and claims priority to U.S. patent application Ser. No. 10/562,329, filed Dec. 23, 2005, now abandoned which claims priority to International Patent Application No. PCT/JP2004/009100, filed on Jun. 28, 2004, which claims priority to Japanese Patent Application No. 2003-188980, filed on Jun. 30, 2003, the subject matter of these patent documents is incorporated by reference herein in its entirety.

BACKGROUND OF THE INVENTION

1. Field of the Invention

This invention generally relates to small-sized step motors for use in cameras or the like, and more particularly, to a step motor suitable for use in driving a shutter, lens, barrier, and the like of a camera.

2. Description of the Related Art

In recent years, cameras have become electronics devices and shutters thereof are driven by the step motors. In addition, cameras are promoted to be small-sized and light-weighted, leading to a demand for small-sized step motors with high accuracy. For example, Japanese Examined Patent Publication No. 2-2382 discloses a step motor that simultaneously excites two coils provided on a stating element (stator) and rotates a rotating element (rotor).

FIG. 7 is a plan view schematically showing a step motor 100 disclosed in Japanese Examined Patent Publication No. 2-2382. A stator 103 having a shape of isosceles trapezoid is provided in an outer periphery of a rotor 101. The stator 103 includes three magnetic poles 104, 105, and 106, and also includes a first coil 108 on the left and a second coil 109 on the right. The rotor 101 composed of a permanent magnet is rotated by controlling the direction of the current applied to the coils 108 and 109 to change the direction of the magnetic field. In addition, the third magnetic pole 106 is magnetically excited by left and right coils, and in particular, the third magnetic pole 106 includes a protrusion portion 107 that comes close to the rotor 101. The protrusion portion 107 is provided so that a North magnetic pole (or South magnetic pole) of the rotor 101 is positioned to the protrusion portion 107 when no magnetic field is set up.

It is preferable, however, that the step motor be designed to start the rotation from a halting state with less power consumption. However, the rotor 101 of the above-mentioned step motor 100 has two magnetic poles, and it is configured that South magnetic pole or North magnetic pole is positioned to the protrusion portion 107 in a halting state. Therefore, the above-described step motor 100 has a drawback that a large amount of energy is consumed at the time of starting the rotation.

SUMMARY OF THE INVENTION

It is an object of the present invention to solve the above-mentioned drawback and provide a step motor in which the power consumption can be suppressed at the time of starting rotation of the rotor.

According, to another aspect of the present invention, there is provided a step motor including a rotor having four magnetic poles; a first magnetic pole magnetically excited by a first coil; a second magnetic pole magnetically excited by a second coil; and a third magnetic pole magnetically excited by the first coil and the second coil. A gap between the third magnetic pole and the rotor is smaller than that between the first magnetic pole and the rotor and that between the second magnetic pole and the rotor. According to the present invention, the gap between the third magnetic pole and the rotor is smaller than that between the first magnetic pole and the rotor and that between the second magnetic pole and the rotor. By employing such configuration, the effect of the magnetic field can be intensified from the third magnetic pole to the rotor having four magnetic poles. Accordingly, it is possible to relatively weaken the magnetic fields set up from the first magnetic pole and the second magnetic pole, which tend to intensify the influence on the rotor, enabling the power consumption to be reduced at the time of starting the rotation of the rotor. Thus, it is possible to provide the step motor, which can save energy and consume less power and generate a high drive torque at the time of starting the rotation.

BRIEF DESCRIPTION OF THE DRAWINGS

Preferred embodiments of the present invention will be described in detail with reference to the following drawings, wherein.

DESCRIPTION OF THE PREFERRED EMBODIMENTS

Figure 1:
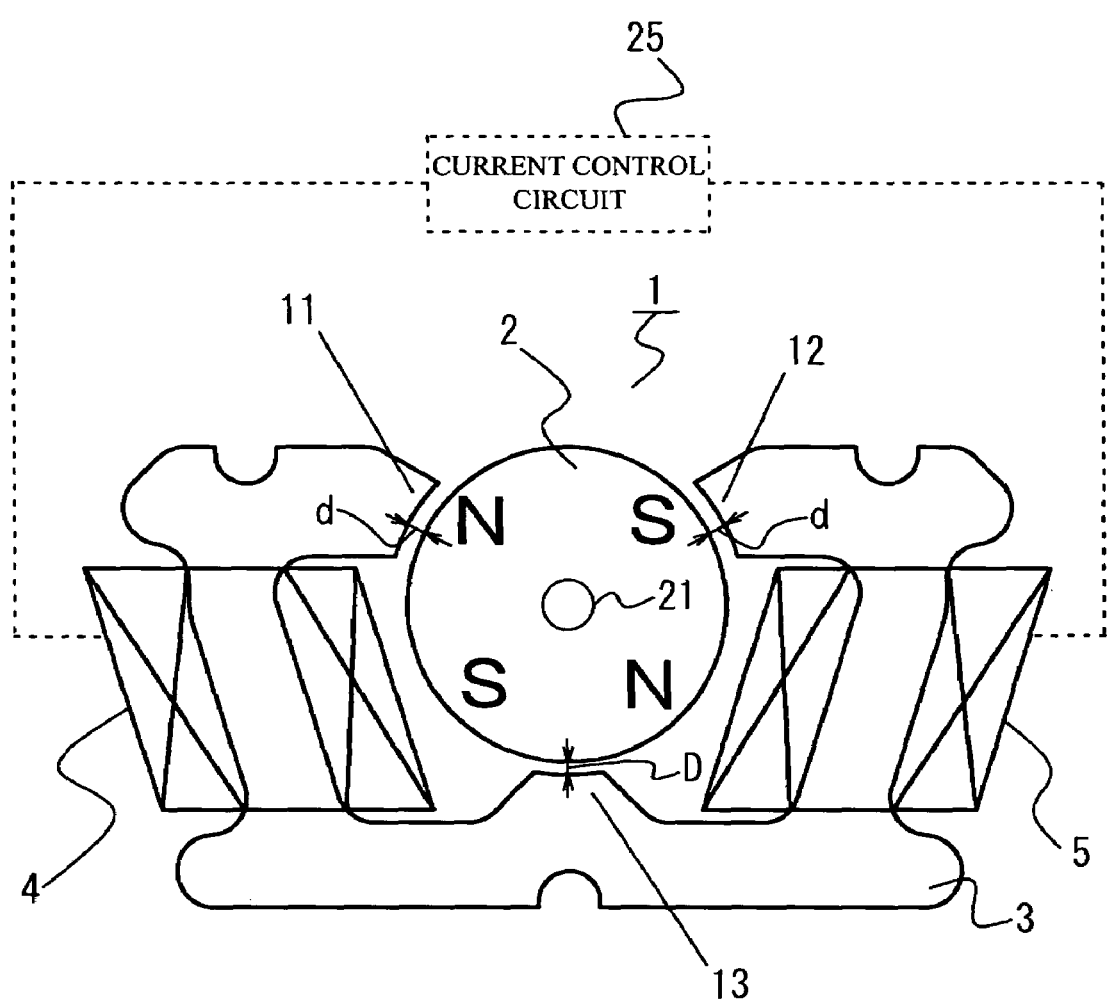
FIG. 1 is a view showing main components of a step motor in accordance with an embodiment.

A description will now be given, with reference to the accompanying drawings, of an embodiment of the present invention. FIG. 1 is a view showing main components of a step motor in accordance with an embodiment of the present invention. A step motor 1 includes a rotor 2 and a stator 3, the rotor 2 being arranged in the center thereof and capable of rotating in both directions, the stator 3 being arranged to face an outer circumference of the rotor 2. The rotor 2 has a cross-section of circle and has a shape of cylinder. The stator 3 is integrally formed to have a plan view of substantially lateral U-shape, and is located in a state that the rotor 2 is housed in an internal space thereof. In addition, the step motor 1 is shown in FIG. 1 with an open end of the lateral U-shape facing upwardly.

The rotor 2 includes four magnetic poles, which are composed of two North magnetic poles and two South magnetic poles. The rotor 2 is a permanent magnet magnetized in positions where the poles having a same polarity face each other, and is rotatably provided in both directions around an axis 21. Both ends of the stator 3 having the above-mentioned lateral U-shape are formed to face a circumferential surface of the rotor 2. The both ends are respectively a first magnetic pole 11 and a second magnetic pole 12. Also, a third magnetic pole 13 is arranged in an intermediate position of the first magnetic pole 11 and the second magnetic pole 12.

A first coil 4 is wound between the first magnetic pole 11 and the third magnetic pole 13, and a second coil 5 is wound between the second magnetic pole 12 and the third magnetic pole 13. The first magnetic pole 11 is magnetically excited when a current flows through the first coil 4, and the second magnetic pole 12 is magnetically excited when a current flows through the second coil 5. In contrast, the third magnetic pole 13 is magnetically excited by both the first coil 4 and the second coil 5. Accordingly, a magnetically excited state of the third magnetic pole 13 is shown as a combination of current-flowing states of the first coil 4 and the second coil 5.

FIG. 1 shows a current control circuit 25, which is indicated as a dotted line and connected to the first coil 4 and the second coil 5 of the step motor 1. In accordance with the present embodiment, the current control circuit 25 supplies the current to magnetically excite the first coil 4 and the second coil 5. Such supplied current includes two patterns that have been set. In a first pattern, the current is supplied from the current control circuit 25 to magnetically excite both the first coil 4 and the second coil 5, and a drive state of the rotor 2 is controlled by changing a current supply direction in each coil. In the first pattern, there are two state: one state is that the first magnetic pole 11 and the second magnetic pole 12 are magnetically excited to have a same magnetic polarity and the other state is that the first magnetic pole 11 and the second magnetic pole 12 are magnetically excited to respectively have different types of magnetic polarity. At this time, if the first magnetic pole 11 and the second magnetic pole 12 are magnetically excited to have the same magnetic polarity, which results in that the third magnetic pole 13 sets up a stronger magnetic field than those of the afore-mentioned magnetic poles. On the contrary, if the first magnetic pole 11 and the second magnetic pole 12 are magnetically excited to respectively have different types of magnetic polarity, magnetization in the third magnetic pole 13 is cancelled each other, resulting in a non-magnetization state.

In a second pattern, the current is supplied from the current control circuit 25 to magnetically excite either the first coil 4 or the second coil 5, and the drive state of the rotor 2 is controlled by changing the current supply direction. In the second pattern, only either the first magnetic pole 11 or the second magnetic pole 12 is magnetically excited, and it is changed to have an opposite magnetic polarity by changing the current supply direction. In the second pattern, the third magnetic pole 13 is magnetically excited to have an opposite polarity of those of the first magnetic pole 11 and the second magnetic pole 12 that has been magnetically excited.

In the first pattern, the drive of the rotor 2 is controlled by a two-phase magnetically excited state in which the first coil 4 and the second coil 5 are magnetically excited. On the other hand, in the second pattern, the drive of the rotor 2 is controlled by a one-phase magnetically excited state in which only either of the first coil 4 or the second coil 5 is magnetically excited. A description will be given later in detail, with reference to the drawings, of rotation states of the rotor 2 in the first pattern and in the second pattern.

In the step motor 1, the rotor 2 is configured to include four magnetic poles, and in particular, is configured to be capable of reducing the torque. This point will now be described. In the step motor 1, a same gap d is configured to be a distance between the circumferential surface of the rotor 2 and the first magnetic pole 11 and a distance between the circumferential surface of the rotor 2 and the second magnetic pole 12. In contrast, a gap D is a distance between the circumferential surface of the rotor 2 and the third magnetic pole 13, and is configured to be smaller than the gap d. The gap D is configured to be narrow so as to intensify the magnetic field set up from the third magnetic pole 13 to work on the rotor 2 and relatively weaken the magnetic field set up from the first magnetic pole 11 and that set up from the second magnetic pole 12 to work on the rotor 2. Preferably, the gap D is configured to be approximately 0.3 to 1 times as long as the gap d. More preferably, approximately 0.8 times.

If the magnetic fields set up from the first magnetic pole 11 and the second magnetic pole 12 intensely work on the rotor 2, this increases detent torque of the rotor 2 in the halting state. Accordingly, in the step motor 1, the gap D between the circumferential surface of the rotor 2 and the third magnetic pole 13 is configured to be small and intensify the influence of the third magnetic pole 13, so as to relatively decrease the magnetic influence produced from the first magnetic pole 11 and the second magnetic pole 12 that work on the rotor 2. Thus, the detent torque is decreased by averaging the magnetic balance between the stator 3 and the rotor 2. This makes it possible to reduce the power consumption in the step motor 1. The conventional step motor as described above is also configured in such a manner that the third magnetic pole is arranged close to the rotor. The rotor in the aforementioned step motor includes two magnetic poles, and a third magnetic pole is arranged close to the rotor so that one of the magnetic poles in the rotor stops to face the third magnetic pole. However, in the step motor 1 in accordance with an embodiment, the third magnetic pole 13 is arranged close to the surface of the rotor 2 so that the magnetic fields set up from the respective magnetic poles to work on the rotor 2 are balanced to reduce the torque. In this manner, different effects are obtainable with seemingly similar configurations. This is because the step motor 1 in accordance with an embodiment of the present invention employs the rotor 2 having four magnetic poles.

Hereinafter, a description will be given of, with reference to FIG. 2A through FIG. 4E, the rotation of the rotor 2 in the step motor 1. FIGS. 2A through 2E show the above-described first current supply pattern, and the rotor 2 is rotated by the two-phase magnetically excited state that excites the first coil 4 and the second coil 5. FIG. 3A through FIG. 4E show the above-described second pattern, and the rotor 2 is rotated by a one-phase magnetically excited state that excites only either the first coil 4 or the second coil 5. In particular, FIGS. 3A through 3E show a case where the first coil 4 is magnetically excited, and FIGS. 4A through 4E show a case where the first coil 4 is magnetically excited. The current is supplied to the coils 4 and 5 shown in FIG. 2A through FIG. 4E by the current control circuit 25 shown in FIG. 1, yet it is not shown in these drawings. In addition, FIG. 3A through FIG. 4E show only coils through which the current is flown to facilitate the understanding.

Figure 2A:
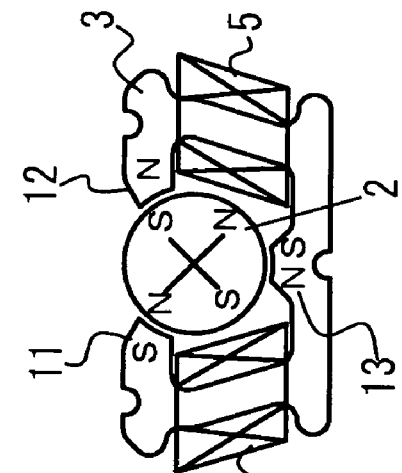
FIGS. 2A through 2E are views showing a case where a rotor of the step motor is rotated in a two-phase magnetically excited state in accordance with an embodiment.

Referring to FIGS. 2A through 2E, a description will be given of how the rotor 2 of the step motor 1 rotates. FIGS. 2A through 2E show the above-mentioned first pattern, and also show a case where the first coil 4 and the second coil 5 are magnetically excited to rotate the rotor 2 in a clockwise direction (in a right-hand direction) at a step angle of 45°. In FIG. 2A, there is no current flowing through the coils 4 and 5. In FIG. 2B through FIG. 2E, the current is controlled to supply to the coils 4 and 5 and rotate the rotor 2 in a clockwise direction in a time-series manner. In FIG. 2A, the first magnetic pole 11 and the second magnetic pole 12 are not magnetically excited, and South magnetic pole and North magnetic pole of the rotor 2 are respectively arranged to face the first magnetic pole 11 and the second magnetic pole 12.

Figure 2B:
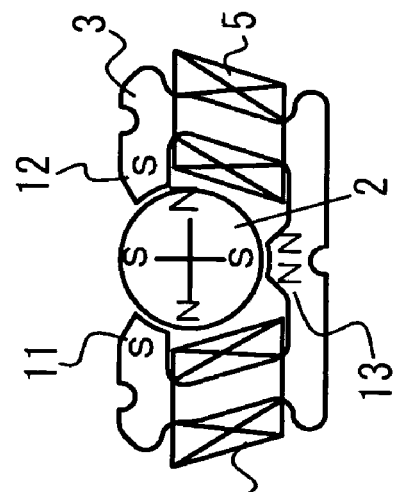
Figure 2C:
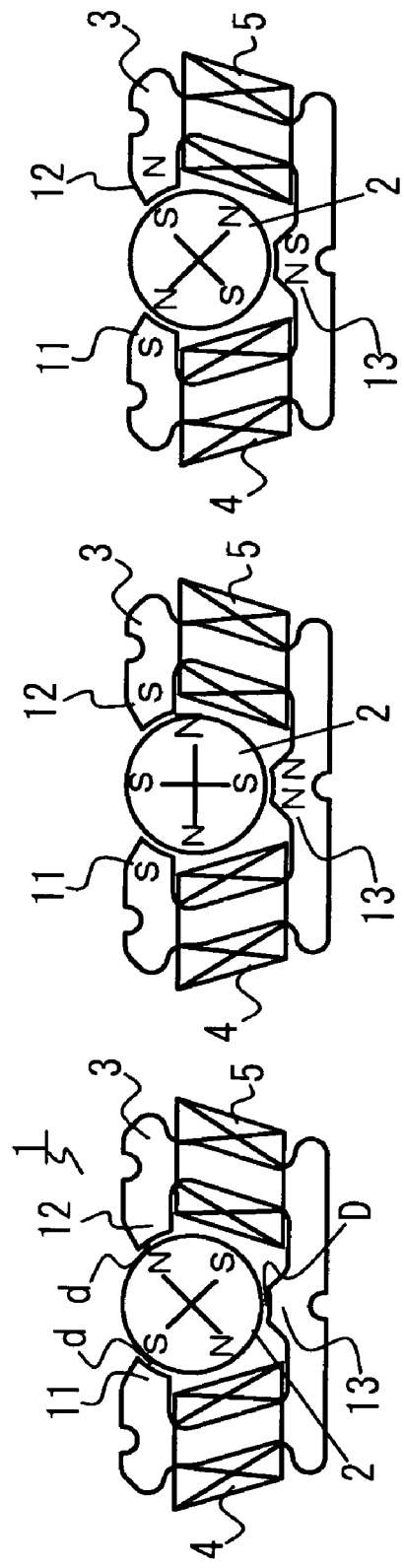
Figure 2D:
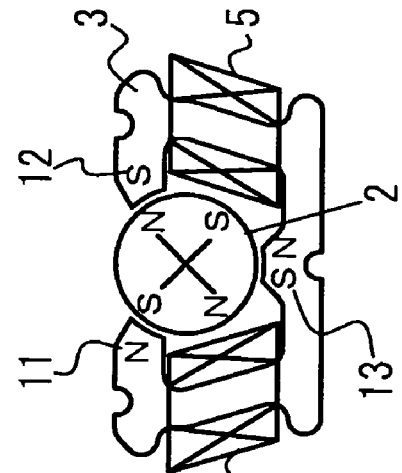
Figure 2E:
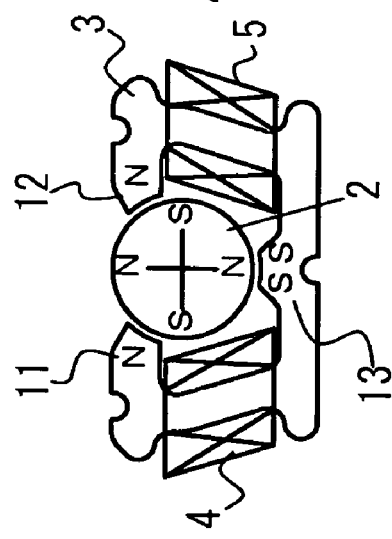

In FIG. 2B, the current flows through the first coil 4 and the second coil 5 from the state shown in FIG. 2A, and both the first magnetic pole 11 and the second magnetic pole 12 are magnetically excited to be South magnetic pole. At this time, the magnitude of North magnetic pole is doubled and excited in the third magnetic pole 13. Next, in FIG. 2C, the excitation state in the first magnetic pole 11 is retained in South magnetic pole from the state shown in FIG. 2B, and the second magnetic pole 12 is magnetically excited to be reversed to North magnetic pole. At this time, North magnetic pole and South magnetic pole are magnetically excited and cancelled each other, resulting in no magnetization in the third magnetic pole 13. In the same manner, in FIG. 2D, the first magnetic pole 11 and the second magnetic pole 12 are both magnetically excited to be North magnetic pole from the state shown in FIG. 2C. At this time, the magnitude of North magnetic pole is doubled and excited in the third magnetic pole 13. Next, in FIG. 2E, the excitation state in the first magnetic pole 11 is retained in North magnetic pole from the state shown in FIG. 2D, and the second magnetic pole 12 is magnetically excited to be opposite, namely, to be South magnetic pole. At this time, North magnetic pole and South magnetic pole are magnetically excited and cancelled each other, resulting in no magnetization in the third magnetic pole 13.

As described, the rotor 2 is rotated in a clockwise direction in steps of 45° as shown in the drawings, as the magnetization state gradually changes in the magnetic poles 11 through 13 in the stator 3. Here, the respective drawings of FIGS. 2A through 2E show that the current flows through the first coil 4 and the second coil 5 and the rotor 2 is located in a position where a rotation of 45° is completed. As shown in FIG. 2B, when the coils 4 and 5 are magnetically excited by the current supplied from the current control circuit 25 and changed from the halting state of the rotor 2 shown in FIG. 2A, the torque is applied to the rotor 2 in a clockwise direction. When the rotor 2 starts rotating in a clockwise direction, the step motor 1 is capable of starting the rotation with relatively less power consumption, because the third magnetic pole 13 is arranged close to the surface of the rotor 2. That is to say, a current amount supplied from the current control circuit can be reduced, enabling the rotor 2 to be rotated for purposes of saving energy.

Figure 3A:
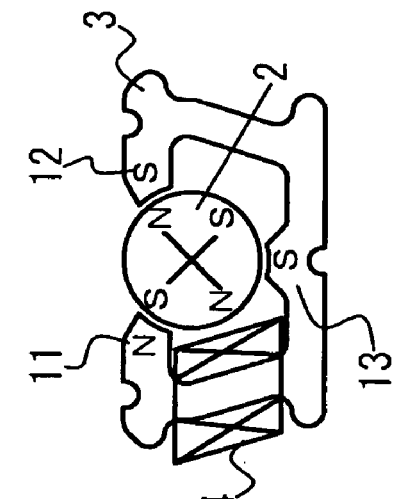
FIGS. 3A through 3E are views showing a case where a rotor of the step motor is rotated in a clockwise direction in a one-phase magnetically excited state in accordance with an embodiment.

FIGS. 3A through 3E show the above-mentioned second current supply pattern, and also show a case where only the first coil 4 is magnetically excited in a one-phase magnetically excited state to rotate the rotor 2 in a clockwise direction (in a right-hand direction) at a step angle of 90°. In FIG. 3A, there are no currents flowing across the coils 4 and 5. In FIG. 3B through FIG. 3E, the current is controlled to supply to the coil 4 to rotate the rotor 2 in a clockwise direction in steps of 90° in a time-series manner. In FIGS. 3A through 3E, a polarity of the first magnetic pole 11 is reversed by reversing the current direction supplied to the first coil 4. At this time, the polarity of the third magnetic pole 13 is an opposite one of the first magnetic pole. In addition, the second magnetic pole 12 is not magnetically excited from the coil, and has the same polarity as that of the third magnetic pole 13.

Figure 3B:
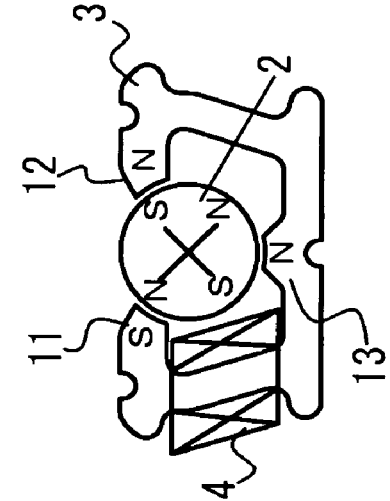
Figure 3C:
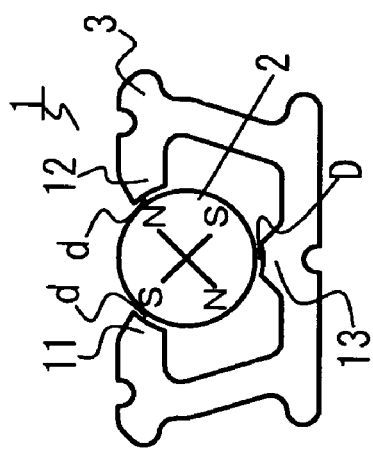
Figure 3D:
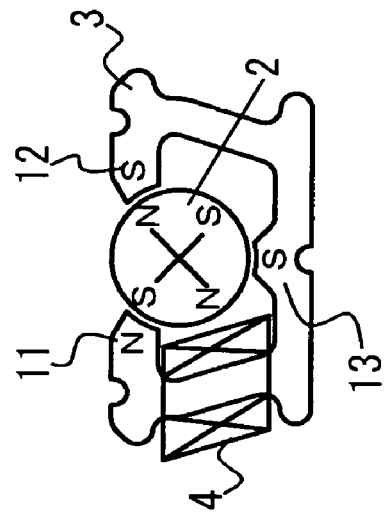
Figure 3E:
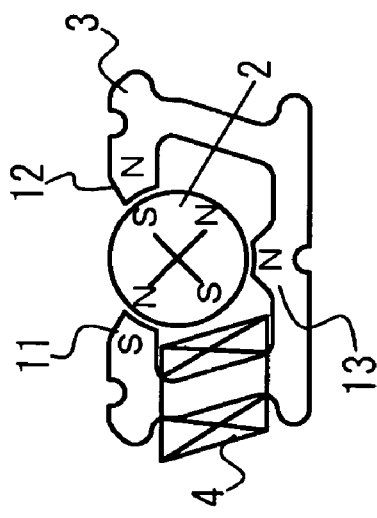
Figure 4A:
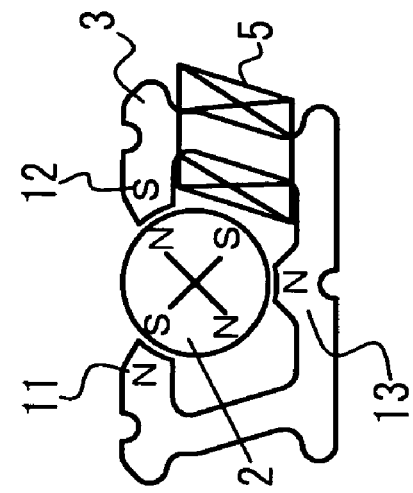
FIGS. 4A through 4E are views showing a case where a rotor of the step motor is rotated in a counterclockwise direction in a one-phase magnetically excited state in accordance with an embodiment.
Figure 4B:
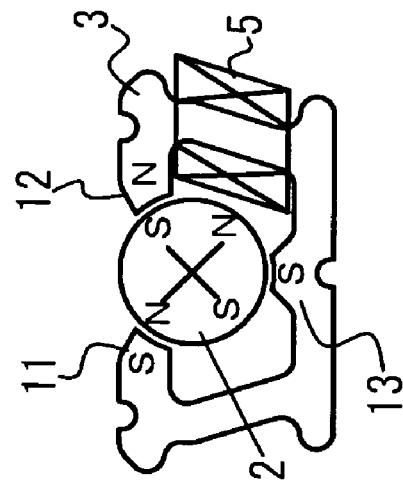
Figure 4C:
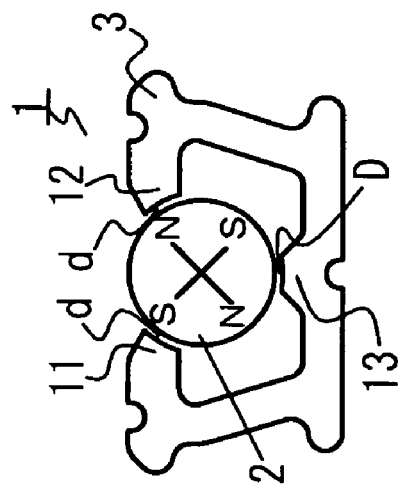
Figure 4D:
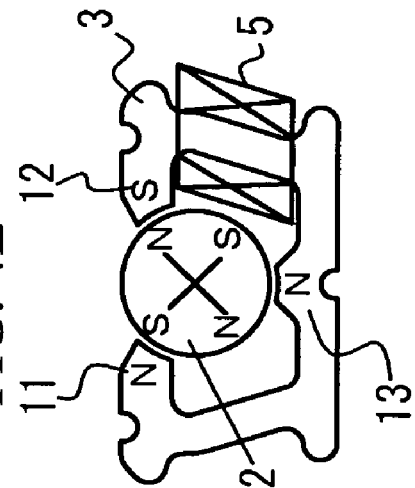
Figure 4E:
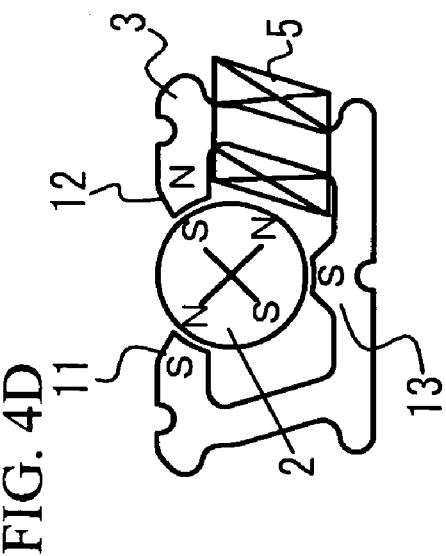

First, in FIG. 3A, the first magnetic pole 11 and the second magnetic pole 12 are not magnetically excited, and South magnetic pole and North magnetic pole of the rotor 2 are respectively arranged to face the first magnetic pole 11 and the second magnetic pole 12, same as shown in FIG. 2A. In FIG. 3B, next, the current flows across the first coil 4 from the state of FIG. 3A, and the first magnetic pole 11 is magnetically excited to be South magnetic pole. At this time, the third magnetic pole 13 and the second magnetic pole 12 are magnetically excited to be North magnetic pole. In FIG. 3C, which is subsequently shown, the first magnetic pole 11 is changed to be North magnetic pole in the magnetically excited state from the state shown in FIG. 3B, and the third magnetic pole 13 and the second magnetic pole 12 are magnetically excited to be reversed to South magnetic poles. In the same manner, in FIG. 3D, the first magnetic pole 11 is magnetically excited to be South magnetic pole from the state shown in FIG. 3C. At this time, the third magnetic pole 13 and the second magnetic pole 12 are magnetically excited to be North magnetic poles. In FIG. 3E, next, the first magnetic pole 11 is changed to be North magnetic pole from the state shown in FIG. 3D, and the third magnetic pole 13 and the second magnetic pole 12 are magnetically excited to be opposite, namely, to be South magnetic pole.

As described above, the rotor 2 is rotated in a clockwise direction in steps of 90° as shown, with the magnetization state gradually changing in the magnetic poles 11 through 13 in the stator 3. Here, the respective drawings of FIGS. 3A through 3E show that the current flows through the first coil 4 and the rotor 2 is located in a position where the rotation of 90° is completed. As shown in FIGS. 3A through 3E, when the coil 4 is magnetically excited by the current supplied from the current control circuit 25 and the rotor 2 starts rotating in a clockwise direction as shown in FIG. 3B from the halting state of the rotor 2 shown in FIG. 3A, the step motor 1 is capable of starting the rotation with relatively less power consumption, because the third magnetic pole 13 is arranged close to the surface of the rotor 2. This enables the rotor 2 to be rotated for purposes of saving energy. Here, the example shown in FIGS. 3A through 3E exhibits a remarkable advantage that the rotor 2 can be rotated in steps of 90° in a clockwise direction with the second coil 5 being in a halting state.

Further, FIGS. 4A through 4E show the above-mentioned second current supply pattern, and also show a case where only the second coil 5 is magnetically excited in a one-phase magnetically excited state to rotate the rotor 2 in a counterclockwise direction at a step angle of 90°. FIGS. 4A through 4E show accurately reverse operations of those in FIGS. 3A through 3E. That is to say, in FIG. 4A, there is no current flowing through the coils 4 and 5. In FIG. 4B through FIG. 4E, the current is controlled to supply to the coil 5 to rotate the rotor 2 in a counterclockwise direction in a time-series manner. In FIGS. 4A through 4E, the polarity of the second magnetic pole 12 is reversed by reversing the current supplied to the second coil 5. Then, the polarity of the third magnetic pole 13 is opposite of that of the second magnetic pole 12. In addition, the first magnetic pole 11 is not magnetically excited from the coil, and has the same polarity as that of the third magnetic pole 13.

The rotor 2 rotates in a counterclockwise direction in steps of 90° as also shown in FIGS. 4A through 4E, with the magnetization state gradually changing in the magnetic poles 11 through 13 in the stator 3. Also, the third magnetic pole 13 is arranged close to the surface of the rotor 2 when the rotor 2 starts rotating in a counterclockwise direction. This makes it possible to start the rotation at a relatively small torque and suppress the power consumption. FIGS. 4A through 4E show a case where the rotor 2 can be rotated in a counterclockwise direction in steps of 90° with the first coil 4 being in a halting state.

Figure 5:
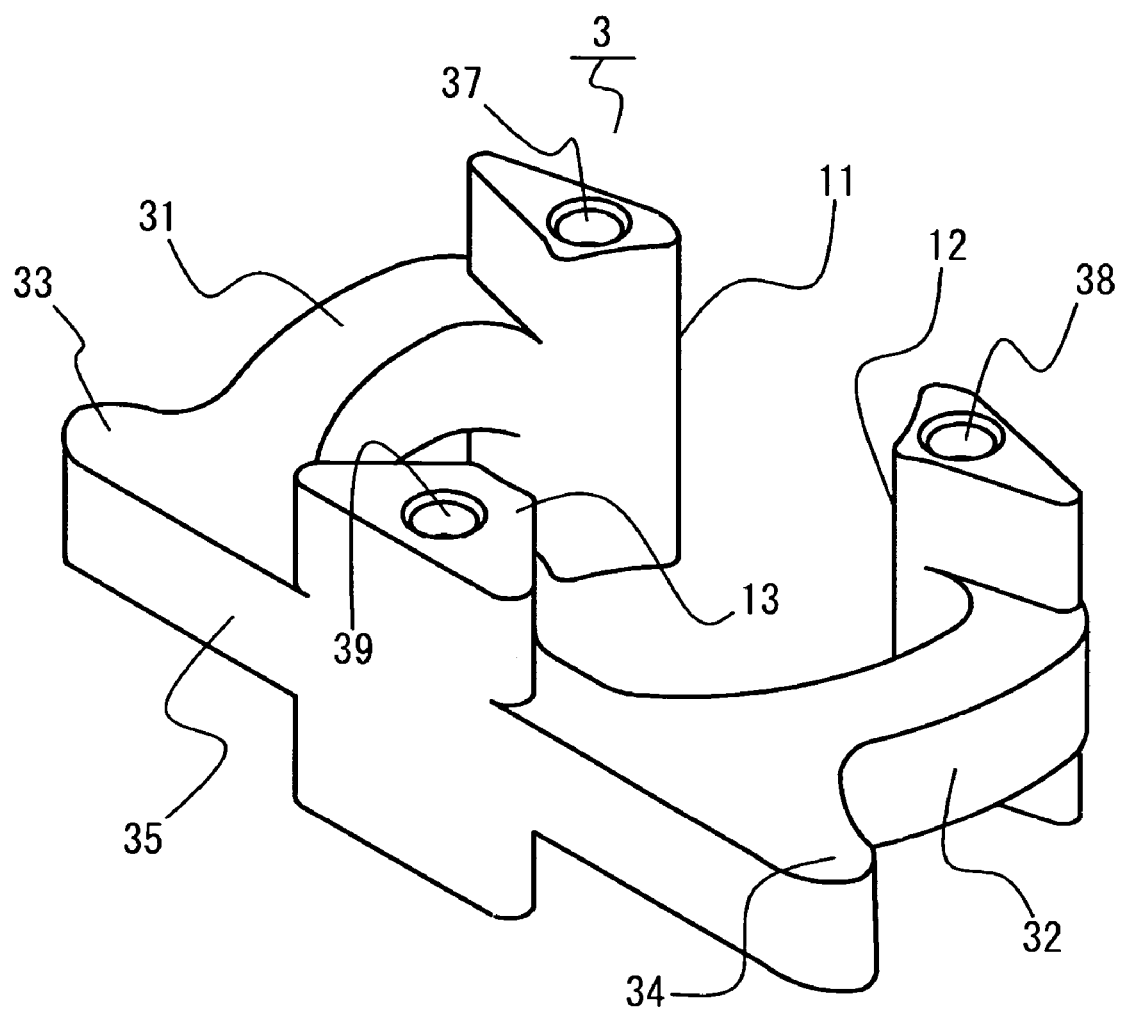
FIG. 5 is a view showing a stator having a preferred shape suitable for use in the step motor.

FIG. 5 is a view showing a stator having a preferable shape suitable for use in the step motor 1. In FIG. 5, the same components and configurations as those of FIG. 1 and FIGS. 2A through 2E have the same reference numerals. The first magnetic pole 11 and the second magnetic pole 12 of the stator 3 are configured to face the circumferential surface of the rotor, not shown, and to be formed into a shape having a vertically longer side to correspond to the longer side of the rotor. The stator 3 includes arms 31 and 32 on both sides, and the arms 31 and 32 are connected to a base 35. The third magnetic pole 13 is formed in the center of the base 35. The third magnetic pole 13 is also formed to have a shape having a vertically longer side, same as those of the first magnetic pole 11 and the second magnetic pole 12. The magnetic poles 11 through 13 are formed to have such a vertically longer side and extend in both directions of thickness of the stator 3. In addition, the shape having a vertically longer side may be formed by extending in either direction of thickness, although the length becomes the half.

The stator 3 includes the arms 31 and 32, around which the coils 4 and 5 are wound for magnetically exciting the first through third magnetic poles. To position the coils 4 and 5, projections 33 and 34 are provided on back ends of the arms. Such provided projections 33 and 34 are capable of realizing the structure, in which the coils 4 and 5 respectively wound around the arms 31 and 32 can be surely positioned. In addition, indentations 37 through 39 are formed on tops of the magnetic poles 11 through 13. The step motor 1 in accordance with the present embodiment is incorporated into a module together with upper and lower cases. The indentations 37 through 39 are for use in positioning the case to be set.

Figure 6:
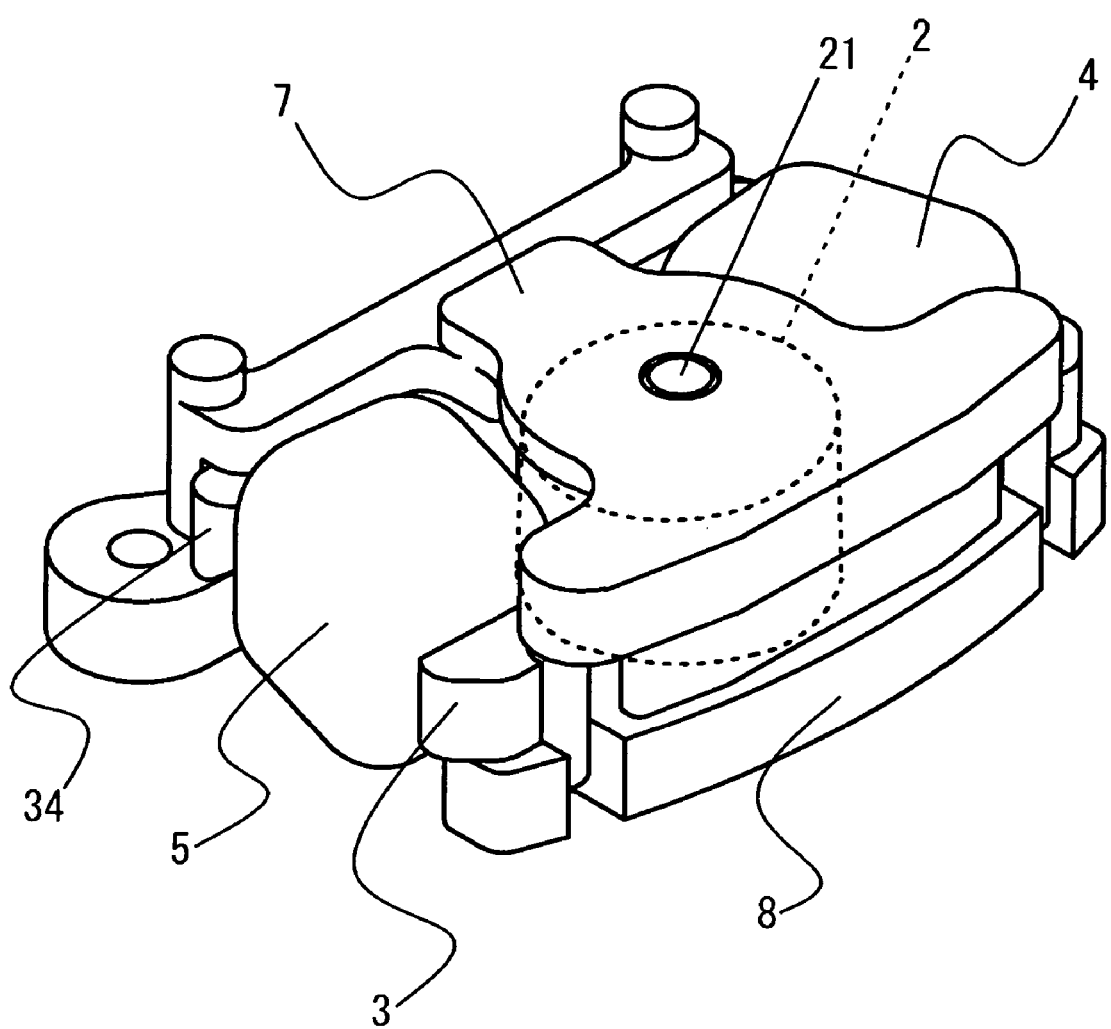
FIG. 6 is a perspective view showing an appearance of a module having a structure of the step motor.
Figure 7:
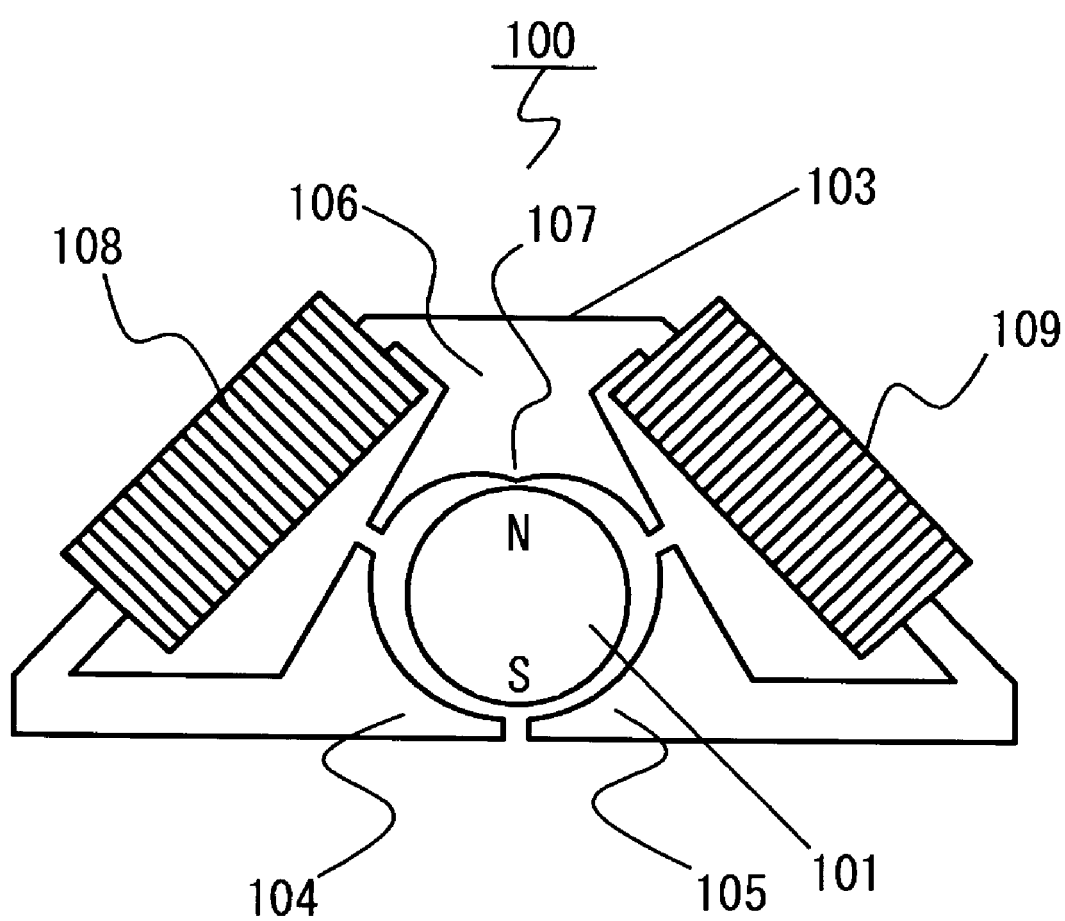
FIG. 7 schematically shows a conventional step motor.

FIG. 6 is a perspective view showing an appearance of the step motor 1, which is incorporated into a module with main components thereof. Also in FIG. 6, the same components and configurations as those of FIG. 1 and FIGS. 2A through 2E have the same reference numerals. FIG. 6 shows a module in which an upper case 7 and a lower case 8 are set together with the main components from top and bottom. Such step motor module is employed for a shutter driving portion of a camera, enabling the step motor that consumes less power at the time of activation. It is possible to set the step angle at 45°, 90°, 135°, 180°, and more, by controlling the current with the current control circuit 25. This makes it possible to provide the step motor with high flexibility, in which the step angle is adjustable.

The afore-mentioned rotor may have a shape of cylinder; a stator having a plan view of substantially lateral U-shape is arranged to face a circumferential surface of the rotor; the first magnetic pole and the second magnetic pole are provided on both ends of the stator; and the third magnetic pole is provided in the center of the stator. In addition, preferably, in the afore-mentioned step motor, the first coil is provided between the first magnetic pole and the third magnetic pole and the second coil is provided between the second magnetic pole and the third magnetic pole; and the stator includes protrusions for preventing displacement of the first coil and the second coil. With such protrusions, the positions of the first coil and the second coil are stable, and it is possible to provide the step motor having a more preferable structure.

Additionally, the first coil and the second coil are connected to a current control circuit that magnetically excites them. It is possible to control the rotation of the stator in a two-phase magnetically excited state by changing the current directions to be applied from the current control circuit to the first coil and the second coil. Furthermore, the first coil and the second coil are connected to a current control circuit that magnetically excites them. The rotation of the stator may be controlled in a one-phase magnetically excited state by changing the current direction to be applied from the current control circuit to either the first coil or the second coil. When the current is supplied to magnetically excite the first coil and the second coil so as to control the drive of the rotor, the rotor may be rotated at a rotor step angle of 45°. Also, when the current is supplied to magnetically excite either the first coil or the second coil so as to control the drive of the rotor, the rotor may be rotated at a rotor step angle of 90°. Accordingly, it is possible to provide the step motor with high flexibility, because the step angle can be changed as described.

ADVANTAGEOUS EFFECT OF THE INVENTION

According to the present invention, it is possible to intensify the influence, on a rotor having four magnetic poles, of the magnetic field set up from a third magnetic pole provided on a stator. This makes it possible to relatively weaken the magnetic fields set up from the first magnetic pole and the second magnetic pole, which intend to intensify the influence on the rotor, and provide a step motor by which a rotor detent torque is small and power consumption is suppressed.

The present invention is not limited to the above-mentioned embodiments, and other embodiments, variations and modifications may be made without departing from the scope of the present invention.

What is claimed is:

1. A step motor comprising:
a rotor having four magnetic poles; and
a stator including:
a first magnetic pole magnetically excited by a first coil;
a second magnetic pole magnetically excited by a second coil, the rotor being partially interposed between the first and second magnetic poles; and
a third magnetic pole magnetically excited by the first coil and the second coil;
wherein a gap between the third magnetic pole and the rotor is smaller than that between the first magnetic pole and the rotor and that between the second magnetic pole and the rotor,
wherein at least any one of the four magnetic poles of the rotor is always positioned so as not to face any of the first through third magnetic poles of the stator.

2. A step motor comprising;
a rotor having four magnetic poles; and
a stator including;
a first magnetic pole magnetically excited by a first coil;
a second magnetic pole magnetically excited by a second coil, the rotor being partially interposed between the first and second magnetic poles; and
a third magnetic pole magnetically excited by the first coil and the second coil;
wherein a gap between the third magnetic pole and the rotor is smaller than that between the first magnetic pole and the rotor and that between the second magnetic pole and the rotor,
wherein the rotor is stably retained with poles of the rotor facing the first magnetic pole and the second magnetic pole when there is no current in the coils.

3. A step motor comprising:
a rotor having four magnetic poles; and
a stator including;
a first magnetic pole magnetically excited by a first coil;
a second magnetic pole magnetically excited by a second coil, the rotor being partially interposed between the first and second magnetic poles; and
a third magnetic pole magnetically excited by the first coil and the second coil;
wherein a gap between the third magnetic pole and the rotor is smaller than that between the first magnetic pole and the rotor and that between the second magnetic pole and the rotor,
wherein the motor is free of a Hall sensor.

* * * * *